United States Patent
Byreddy et al.

(10) Patent No.: US 8,641,374 B2
(45) Date of Patent: Feb. 4, 2014

(54) CLEANING AND INSPECTING APPARATUS FOR WIND TURBINE AND RELATED METHODS

(75) Inventors: Chakradhar Byreddy, Spring, TX (US); Robert Bowyer, London (GB); Ashish Sareen, Sugar Land, TX (US)

(73) Assignee: Vestas Wind Systems A/S, Aarhus N. (DK)

( * ) Notice: Subject to any disclaimer, the term of this patent is extended or adjusted under 35 U.S.C. 154(b) by 842 days.

(21) Appl. No.: 12/827,482

(22) Filed: Jun. 30, 2010

(65) Prior Publication Data

US 2012/0003089 A1    Jan. 5, 2012

(51) Int. Cl.
*F03D 11/00*    (2006.01)

(52) U.S. Cl.
USPC .......................... 415/232; 416/61; 416/146 R

(58) Field of Classification Search
USPC .................... 416/61, 146 R, DIG. 6; 415/232
See application file for complete search history.

(56) References Cited

U.S. PATENT DOCUMENTS

| | | | | | |
|---|---|---|---|---|---|
| 5,351,783 | A | * | 10/1994 | Celli | 182/133 |
| 5,352,297 | A | * | 10/1994 | Peters | 134/15 |
| 6,111,553 | A | * | 8/2000 | Steenbuck | 343/891 |
| 7,614,364 | B2 | * | 11/2009 | van den Berg et al. | 119/57.92 |
| 7,934,585 | B2 | * | 5/2011 | Iversen | 182/142 |
| 8,052,819 | B2 | * | 11/2011 | Munaux et al. | 156/169 |
| 8,397,382 | B2 | * | 3/2013 | Anasis et al. | 29/889.1 |
| 2009/0020361 | A1 | * | 1/2009 | Teichert | 182/36 |
| 2010/0332016 | A1 | * | 12/2010 | Abrams et al. | 700/160 |
| 2011/0127109 | A1 | * | 6/2011 | Teichert | 182/19 |
| 2011/0138937 | A1 | * | 6/2011 | Fritz | 73/865.8 |
| 2011/0318496 | A1 | * | 12/2011 | Jensen et al. | 427/427.3 |

FOREIGN PATENT DOCUMENTS

| | | | |
|---|---|---|---|
| DE | 4339638 | * | 5/1995 |
| DE | 102005031801 | * | 8/2006 |
| DE | 102008019680 | * | 11/2009 |
| JP | 7-21808 | * | 1/1995 |
| WO | WO03/048569 | * | 6/2003 |
| WO | 2005/054672 | | 6/2005 |
| WO | 2005/064152 | | 7/2005 |
| WO | 2007/085265 | | 8/2007 |
| WO | WO2009/155917 | * | 12/2009 |

OTHER PUBLICATIONS

Luttuschka, External access equipment to wall of circular structure, May 24, 1995, Abstract of DE4339638.*
Paulsen, Cleaner for wind power generator tower, Aug. 24, 2006, Abstract of DE102005031801.*
Elkmann, Inspection platform for wind turbine rotor blades, Nov. 12, 2009, Abstract of DE102008019680.*
Hattori, Road illumination lighting fixture suitable cleaning and cleaning method thereof, Jan. 24, 1995, Abstract of JP7-21808.*

* cited by examiner

*Primary Examiner* — Edward Look
*Assistant Examiner* — Liam McDowell
(74) *Attorney, Agent, or Firm* — Patterson & Sheridan, LLP

(57) ABSTRACT

A maintenance apparatus is provided for use with a wind turbine that has a tower, a hub supported by the tower, and a plurality of blades extending outwardly from the hub. The maintenance apparatus has a mounting element that is configured to be secured to the tower and to be selectively movable along the length thereof. A robotic arm is coupled to the mounting element, and a blade-engaging device is coupled to the robotic arm and is configured to engage one of the blades to effect a maintenance task thereon.

21 Claims, 5 Drawing Sheets

CLEANING AND INSPECTING APPARATUS FOR WIND TURBINE AND RELATED METHODS

TECHNICAL FIELD

The present invention relates generally to wind turbines and, more particularly, to apparatus and methods for cleaning and inspecting the blades of wind turbines.

BACKGROUND

Wind turbines are known to generate their highest yield (i.e., operating efficiency) under predetermined aerodynamic conditions of the blades. In this regard, the quality of the surface of the blades plays an important role in achieving the desired level of yield. It is commonly known that after a predetermined length of time of operation, contaminants such as dust, salt coatings, dead insects, bird droppings and other surface coatings tend to accumulate on the surfaces of the blades, resulting in a decreased operating efficiency of the wind turbine.

In order to address this decrease in efficiency, maintenance operations are carried out on a regular basis to remove contaminants from the surfaces of the blades. Some of these contaminants as well as weather-related events are also known to generate defects such as cracks or other types of discontinuities on the surfaces of the blades. In order to address this possibility, a different type of maintenance operation is also carried out on a regular basis, in which the surfaces of the blades are scanned for defects.

Both of the above-discussed types of maintenance operations require down time, in which the wind turbine is not operating, and may require operator intervention, which increases the overall cost of operating the wind turbine. Down time is detrimental to the overall return on investment of the wind turbine and includes several tasks. For example, down time includes the time that it takes for ground-based equipment (e.g., a truck) to be deployed to the base of the wind turbine, as well as the time that it takes an operator to position himself/herself at a desirable height in order to reach the blades. It is therefore desirable to minimize the down time as well as the operating costs associated with those types of maintenance operations.

There is a need, therefore, for apparatus and related methods that are capable of providing maintenance to the blades of a wind turbine in a time efficient and cost effective manner.

SUMMARY

In one embodiment, a maintenance apparatus is provided for use with a wind turbine that has a tower, a hub supported by the tower, and a plurality of blades extending outwardly from the hub. The maintenance apparatus has a mounting element that is configured to be secured to the tower and to be selectively movable along the length of the tower. A robotic arm is coupled to the mounting element, and a blade-engaging device is coupled to the robotic arm and is configured to engage one of the blades to thereby effect a maintenance task on that blade.

In another embodiment, a wind turbine is provided having a tower, a hub supported by the tower, and a plurality of blades extending outwardly from the hub. A mounting element is secured to the tower and is selectively movable along the length of the tower. A robotic arm is coupled to the mounting element, and a blade-engaging device is coupled to the robotic arm and is configured to engage one of the blades.

In yet another embodiment, a method is provided for performing maintenance on a wind turbine having a tower, a hub supported by the tower, and a plurality of blades that extend outwardly from the hub. The method includes supporting a robotic arm with the tower. The method also includes controlling movement of the robotic arm to selectively engage one of the blades with a blade-engaging device coupled to the robotic arm. At least one of a cleaning operation or a defect-inspection operation is performed on the one of the blades with the blade engaging device. In a specific embodiment, the method includes simultaneously cleaning and inspecting a surface of the one of the blades with the blade-engaging device.

BRIEF DESCRIPTION OF THE DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION

Figure 1:
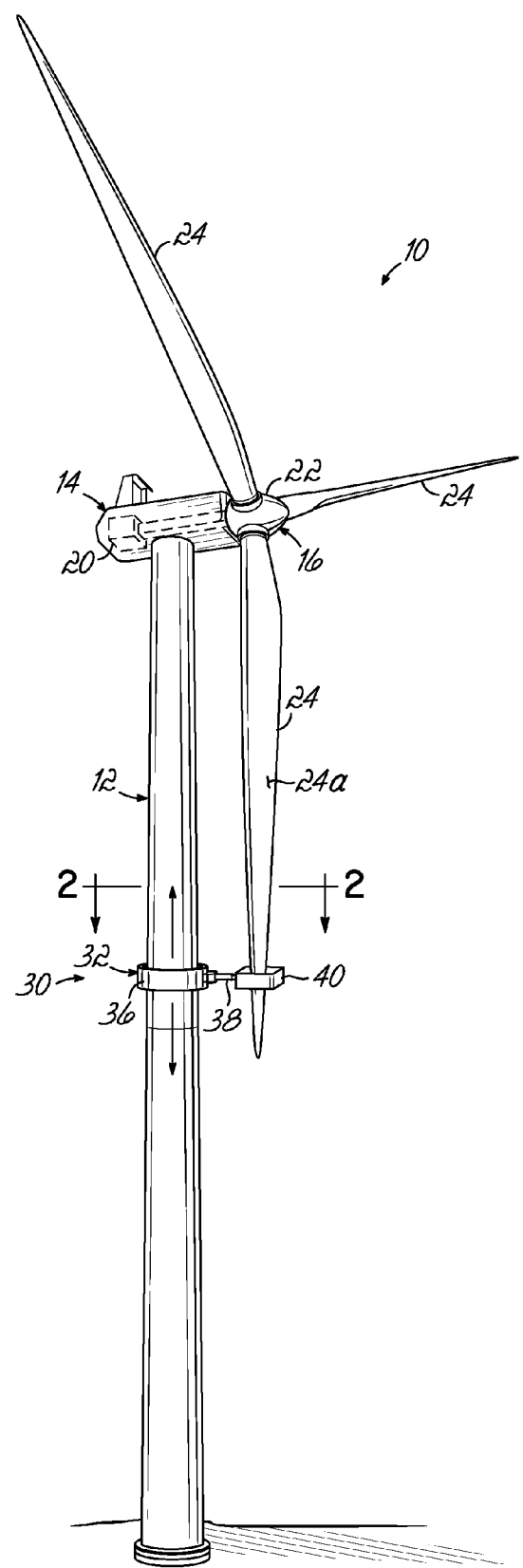
FIG. 1 is a perspective view of a wind turbine in accordance with one embodiment of the invention.

With reference to the figures, and more specifically to FIG. 1, an exemplary wind turbine 10 includes a tower 12, a nacelle 14 at the apex of the tower 12, and a rotor 16 operatively coupled to a generator 20 housed inside the nacelle 14. The wind turbine 10, which is represented as a horizontal-axis wind turbine, has the ability to convert the kinetic energy of the wind into electrical energy. In addition to the generator 20, nacelle 14 houses various components needed to convert the wind energy into electrical energy and also various components needed to operate and optimize the performance of the wind turbine 10. The tower 12 supports the load presented by the nacelle 14, rotor 16, and other wind turbine components housed inside the nacelle 14. The tower 12 of the wind turbine 10 operates to elevate the nacelle 14 and rotor 16 to a height above ground level or sea level, as may be the case, at which wind with faster moving air characterized by smoother and less turbulent air currents is typically found.

The rotor 16 includes a central hub 22 and a plurality of blades 24 attached to and extending outwardly from the central hub 22 at locations distributed about the circumference of the central hub 22. In the representative embodiment, the rotor 16 includes three blades 24. The blades 24, which project radially outward from the central hub 22, are configured to interact with the passing air flow to produce lift that causes the central hub 22 to spin about its longitudinal axis. The design and construction of the blades 24 are familiar to a person having ordinary skill in the art. For example, each of the blades 24 is connected to the central hub 22 through a pitch mechanism that allows the blade to pitch under control of a pitch controller. Wind exceeding a minimum level will activate the rotor 16 and allow it to rotate in a substantially perpendicular direction to the wind. The rotation movement is converted to electric power by the generator 20 and is usually supplied to the utility grid as known to a person having ordinary skill in the art.

Figure 2:
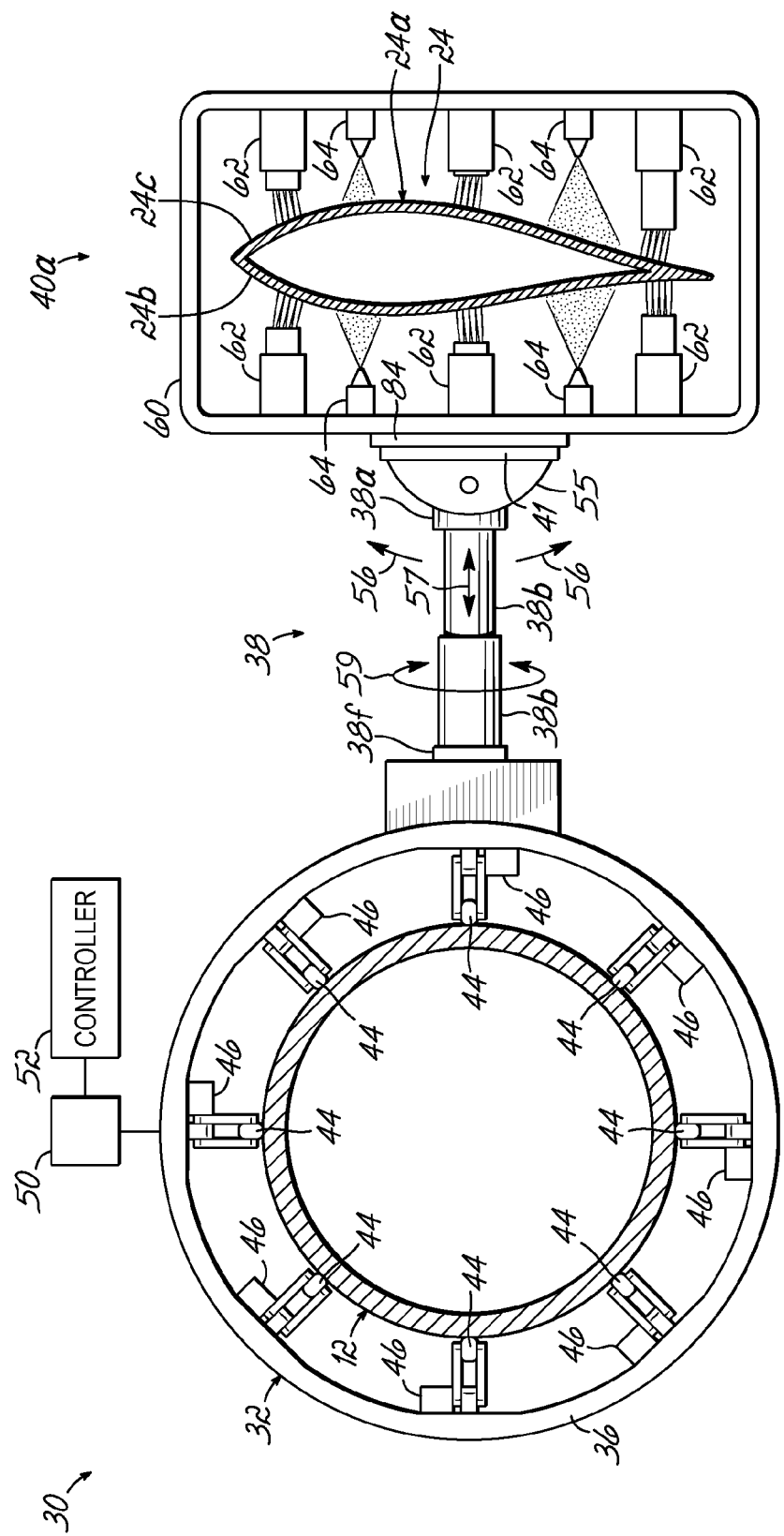
FIG. 2 is a cross-sectional view taken generally along line 2-2 of FIG. 1, illustrating an apparatus for cleaning and/or inspecting the surface of a blade of the wind turbine of FIG. 1.

With reference to FIGS. 1 and 2, the wind turbine 10 includes a blade-engaging device in the form of a cleaning and inspecting apparatus 30 that is selectively configured to clean the surfaces of the blades 24, and/or to inspect the condition of the blades 24 e.g., inspect the surfaces of the blades 24 for defects. As used herein, the term "blade-engaging device" is intended to include apparatus that may or may not come in direct physical contact with the blades 24. For example, a blade-engaging device may take the form of a blade inspecting apparatus having no components that make physical contact with the blades 24, but which uses non-contacting inspecting elements to detect defects on the surfaces of the blades 24. The apparatus 30 includes a mounting element 32 which, in this embodiment, includes a collar 36 mounted onto and surrounding the tower 12. The apparatus 30 also includes one or more robotic arms 38 coupled to the mounting element 32, and to which an interchangeable cleaning and/or inspecting device 40 is releasably coupled, as explained more fully below. The mounting element 32 is configured to move along the length of the tower 12. To this end, the mounting element 32 includes a plurality of rollers 44 coupled to the collar 36, such that rotation of the rollers permits the collar 36 to move up and down the surface of the tower 12 as indicated by the arrows in FIG. 1. The rollers 44 are coupled to the collar 36 through respective spring loaded mounts or brackets 46. The spring loaded mounts 46 facilitate permanent contact of the rollers 44 with the surface of the tower 12.

Notably, the spring loaded mounts 46 bias the rollers 44 against the surface of the tower 12 so that permanent contact between the rollers 44 and the tower 12 is maintained even as the surface configuration (e.g., diameter) of the tower 12 changes along the length thereof. In a specific embodiment, the rollers 44 are instead mounted onto telescopic mounts (not shown), rather than to the spring-loaded mounts 46. In that embodiment, the telescopic mounts are selectively extended or collapsed to adjust their length based on the specific diameter of the tower 12 at the location of engagement of the rollers 44 with the tower 12. To this end, the telescopic mounts may be operatively coupled to a motor or similar device and to a controller 52, which directs controlled adjustment of the length of the telescopic mounts.

Figure 2A:
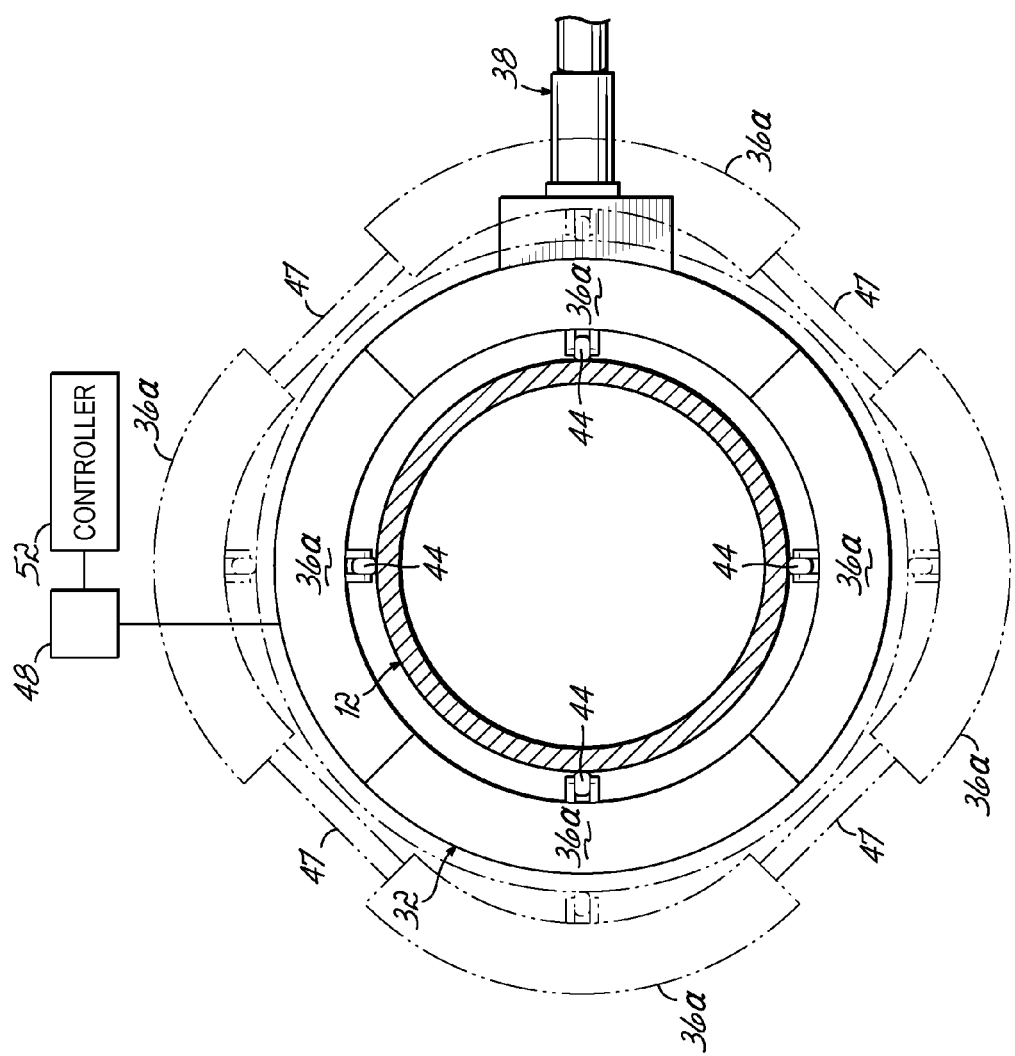
FIG. 2A is a top view of another embodiment of an apparatus for cleaning and/or inspecting the surface of a blade of the wind turbine of FIG. 1.

In yet another embodiment, illustrated at FIG. 2A, the mounting element 32 is made up of a plurality of collar segments 36a, each mounted on a telescopic mount 47. Each of the telescopic mounts 47 is in turn operatively coupled to a motor 48 or similar device and to a controller 52, which is configured to adjust the overall dimensions of the mounting element 32 so as to conform to the size (e.g., diameter) of the tower 12.

With continued reference to FIGS. 1 and 2, the apparatus 30 also includes a propelling mechanism 50 (diagrammatically depicted) that propels the mounting element 32 in a desired direction (i.e., up or down) so as to reach different locations along the length of a blade 24 being cleaned and/or inspected. The propelling mechanism 50 is suitably chosen and may be, for example, pneumatic, magnetic, hydraulic, or a combination thereof. The propelling mechanism 50 is, in turn, operatively coupled to the controller 52 or to some other controller, which directs the propelling mechanism 50 to move the apparatus 30 in a desired direction. In one specific embodiment, the propelling mechanism 50 is operatively coupled to one or more of the rollers 44, thereby controlling the rotation of that one or more rollers 44.

In that specific embodiment, additionally, the propelling mechanism 50 selectively stops rotation of the one or more rollers 44 once a predetermined position (e.g, height) has been reached by the collar 36 and the rollers 44 may be prevented from rolling, which then frictionally engages the surface of the tower 12. The frictional engagement of the rollers 44 relative to tower 12, in turn, prevents the collar 36 from sliding down along the tower 12. An optional braking device (not shown) of the propelling mechanism 50 may be present to prevent rotation of the rollers 44, and may take the form of a hydraulic, magnetic, or pneumatic braking device, for example.

The robotic arm 38 has a first end 38a that is pivotally coupled to the cleaning and/or inspecting device 40 through a swivel connection 55, and a second end 38f rigidly coupled to the collar 36. It is contemplated that, alternatively, the robotic arm 38 may be pivotally coupled to the device 40 through another swivel connection (not shown). The cleaning and/or inspecting device 40 can be pivotally raised and lowered, as well as laterally pivoted (arrows 56) about the swivel connection 55, relative to the robotic arm 38, thereby facilitating maneuvering of the interchangeable cleaning and/or inspecting device 40 so as to reach different locations of the blade 24 being cleaned and/or inspected.

In another aspect of the embodiment of FIGS. 1 and 2, the robotic arm 38 has a variable length. More specifically, the robotic arm 38 is a telescoping structure such that its length can be selectively increased or decreased respectively by extending or collapsing (arrow 57) telescoping portions 38b thereof in ways known in the art. The robotic arm 38 is operatively coupled to a controller, such as the exemplary controller 52, which directs the portions 38b to move relative to one another so as to increase or decrease the overall length of the robotic arm 38. In yet another aspect, one or more portions 38b of the telescoping robotic arm 38 may be capable of rotating about the longitudinal axis of the robotic arm 38 (arrow 59).

Figure 3:
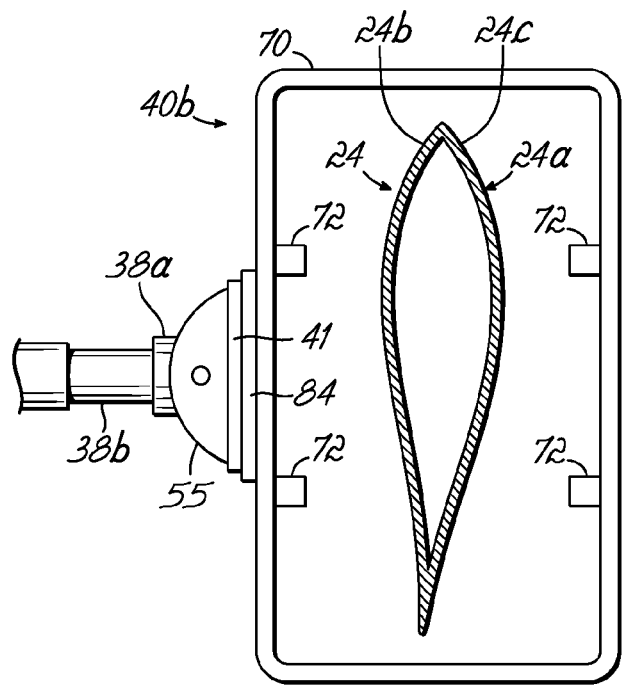
FIG. 3 is a partially broken away view of another embodiment of a blade-engaging device of the apparatus of FIG. 2.
Figure 4:
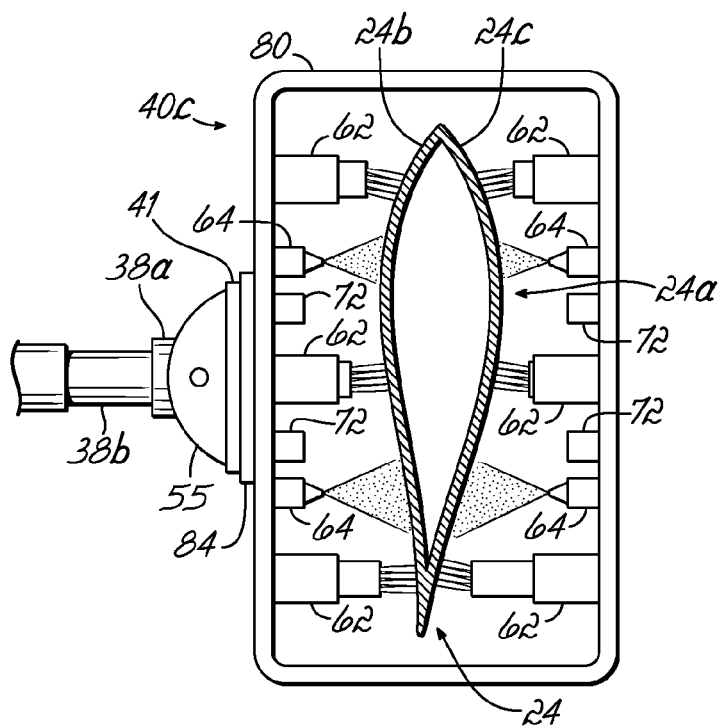
FIG. 4 is a partially broken away view of yet another embodiment of a blade-engaging device of the apparatus of FIG. 2.

With continued reference to FIGS. 1 and 2, and further referring to FIGS. 3 and 4, the cleaning and/or inspecting device 40 is an interchangeable component of cleaning apparatus 30. To this end, the first end 38a of the robotic arm 38 includes a coupling element 41 that permits releasable coupling of the interchangeable cleaning and/or inspecting device 40 with the robotic arm 38. In this regard, the device 40 can be easily interchanged with other devices suited for a specific task. More specifically, and particularly referring to FIGS. 2-4, the device 40 may take the form a cleaning head 40a (FIG. 2), an inspecting head 40b fitted with ultrasound or X-ray components capable of detecting defects on the surface of the blade 24 (FIG. 3), or a combined cleaning and inspecting head 40c capable of simultaneously cleaning and inspecting (i.e., for defects) the surface of the blade 24 (FIG. 4).

Referring particularly to FIG. 2, an exemplary embodiment of a cleaning device 40a of the apparatus 30 includes a frame 60 supporting one or more brushes 62 and one or more nozzles 64. When the apparatus 30 is deployed, the frame 60 is positioned so as to surround the cross-section of the blade 24. The nozzles 64 are fluidly coupled to a source of cleaning fluid through one or more hoses (not shown) located on the ground. The hoses may be, in turn, fluidly coupled to a pipe extending within the interior of robotic arm 38, and which is fluidly coupled to the nozzles 64. The cleaning device 40a is operatively coupled to the controller 52 through wires (not shown) extending within the robotic arm 38, for example, such that the controller 52 may selectively actuate one or more valves (not shown) of the nozzles 64 to thereby dispense the cleaning fluid. The brushes 62 cooperate with the nozzles 64 to engage the surface 24a of the blade 24, which facilitates removal of contaminants from the surface 24a. In one embodiment, the controller 52 causes the entire frame 60 to move in a predetermined direction (e.g., fore and aft) about the swivel connection 55, with that movement resulting in abrasive engagement of the bristles of the brushes 62 with the surface 24a.

In another specific embodiment, the one or more brushes 62 are actuatable to move against the surface 24a independently of frame 60. More specifically, the one or more brushes 62 may be mounted on a corresponding number of spindles (not shown) that are operatively coupled to the controller 52, such that the controller 52 may actuate a motor driving the spindles to thereby cause the brushes 62 to rotate. In that embodiment, rotation of the brushes 62 is effective to remove contaminants from the surface 24a of blade 24.

Figure 5:
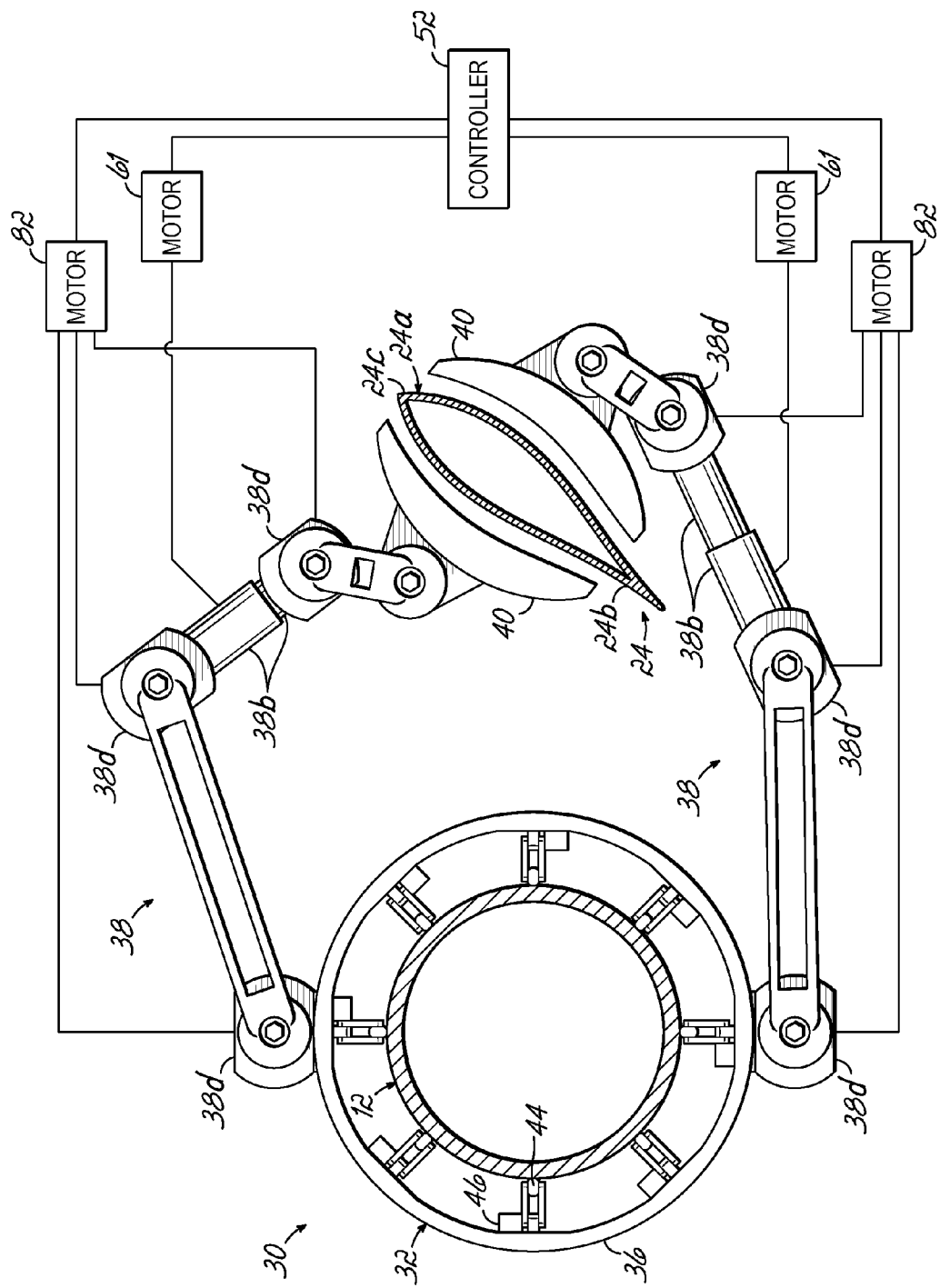
FIG. 5 is a top view of another embodiment of an apparatus for cleaning and/or inspecting the surface of a blade of the wind turbine of FIG. 1.

The embodiment shown in FIG. 5 includes two robotic arms 38 coupled to the mounting element 32, and each having a cleaning and/or inspecting device 40 coupled to the end thereof. In that embodiment, the respective nozzles 64 and brushes 62 are configured to clean and/or inspect one of the two faces 24b, 24c of the blade 24. The simultaneous cleaning and/or inspecting of the two faces 24b, 24c by the two cleaning and/or inspecting devices 40 increases the overall efficiency of the maintenance operation, by decreasing the length of time required to clean and/or inspect the entire surface 24a (FIG. 1) of the blade 24.

With particular reference to FIG. 3, an exemplary embodiment of an inspecting device 40b of the apparatus 30 includes a frame 70 supporting one or more inspecting elements 72, diagrammatically depicted for illustration purposes. The inspecting elements 72 may take the form of X-ray inspecting elements or ultrasound inspecting elements. The inspecting elements 72 are configured to scan the surface 24a (FIG. 1) of the blade 24 and detect a discontinuity or other defect on the surface 24a (FIG. 1). In operation, detection by an inspecting element 72 of a suspected defect on the surface 24a (FIG. 1) results in a signal being generated and transmitted to a controller, such as the controller 52 described above. Upon receiving that signal, the controller (e.g., controller 52) may be configured, in response, to communicate a message or generate an alarm to a remote facility or to a local facility, advising of the detection of a defect, or may instead store the data associated with the inspection in a computerized database located in the remote or local facility, for subsequent analysis of the data by operators at that facility or some other facility. A remote facility may be used, for example, in the case of a wind turbine 10 that is located at a remote location or deployed at sea. A local facility, on the other hand, may be used for wind turbines 10 that are located on land at an accessible location.

With particular reference to FIG. 4, in which like reference numerals refer to similar features in the preceding embodiments, an exemplary device 40c of the apparatus 30 combines the cleaning and inspecting features of the devices 40a and 40b described above. More specifically, the device 40c includes a frame 80 that supports one or more brushes 62, one or more nozzles 64, and one or more inspecting elements 72. The brushes 62, nozzles 64, and inspecting elements 72 are similar in structure and function to the similarly numbered features of the devices 40a, 40b, which may be referenced for an understanding of the features of device 40c as well. Notably, engagement of the device 40c with the surface 24a (FIG. 1) of a blade 24 permits simultaneous cleaning and inspecting of the surface 24a (FIG. 1). This simultaneous operation further increases the overall efficiency of maintenance operations effectuated on the blade 24, specifically by reducing the length of downtime devoted to cleaning and inspecting each blade 24. In addition, the combined cleaning and inspecting capabilities of the device 40c can be combined with the overall structure of the embodiment of FIG. 5, described more fully below, to further increase the efficiency of the maintenance operation by the use of more than one (e.g., two) of those devices 40c, i.e., each configured to engage each of the two faces 24b, 24c of the blade 24.

With reference to FIG. 5, in another embodiment of the invention, the robotic arm 38 includes one or more swivel joints or elbows 38d connecting portions of the robotic arm 38 that may pivot relative to one another. Those of ordinary skill in the art will readily appreciate that the robotic arm 38 may have any suitably chosen configuration. For example, a robotic arm 38 may include no joint or elbow 38d at all or alternatively include any number of joints or elbows 38d such as those illustrated in FIG. 5. In operation, specifically during cleaning or inspecting of a blade 24, the controller 52 actuates one or more motors 82 or similar devices controlling movement of the portions of the robotic arm 38 about the joints or elbows 38d, actuates a motor 61 controlling telescoping motion of the portions 38b relative to one another, and also controls any other motors or similar devices providing swiveling movement of the robotic arm 38 relative to the collar 36, and/or swiveling movement of the cleaning and/or inspecting device 40 relative to the robotic arm 38. This actuation by controller 52 of the different components of the apparatus 30 facilitates engagement of different portions of the cleaning and/or inspecting device 40 with blade 24, thereby permitting cleaning and/or inspecting of different portions of the surface of the blade 24.

As discussed above, the devices 40a, 40b, 40c are interchangeable with one another. This interchangeability is facilitated by the presence of the coupling element 41 of the robotic arm 38, which cooperates with a releasable coupling element 84 that forms part of the frame 60, 70, 80. Those of ordinary skill in the art will readily appreciate that the structure and function of the coupling elements 41, 84 may be suitably chosen, so long as they permit easy coupling and decoupling of the robotic arm 38 and frame 60, 70, 80 to/from one another. For example, and without limitation, the coupling elements 41, 84 may be of the snap-release type, and/or may be free of rotating fastening elements such as screws or bolts. In one specific embodiment, the coupling elements 41, 84 may take the form of a pair of prongs (not shown) of the robotic arm 38 that are received within a corresponding pair of slots (not shown) of the frame 60, 70, 80. In that specific embodiment, an optional latch (e.g., spring-loaded latch, not shown) may be present to secure the prongs relative to the slots.

In use, a cleaning and/or inspecting device 40 (FIG. 1) coupled to the robotic arm 38 may be replaced with another cleaning and/or inspecting device 40 by first lowering the apparatus 30 toward the bottom of the wind turbine 10, such that the components of the apparatus 30 may be reached by an operator at ground level. The operator then proceeds to decouple the device 40 from the robotic arm 38, including decoupling of hoses supplying cleaning fluid to the nozzles 64, as well as wires communicating data and/or power between the controller 52 and the inspecting elements 72. The operator then couples another device 40 to the robotic arm 38.

While the present invention has been illustrated by a description of various embodiments and while these embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. A maintenance apparatus for use with a wind turbine, the wind turbine having a tower, a hub supported by the tower, and a plurality of blades extending outwardly from the hub, the maintenance apparatus comprising:
a mounting element comprising an annular member configured to be coaxial with the tower, to at least partially encircle the tower and be secured thereto, the mounting element further comprising a plurality of positioning elements configured to selectively move the mounting element along a length of the tower;
a robotic arm coupled to the mounting element; and
a first blade-engaging device coupled to the robotic arm and configured to engage one of the blades, thereby performing a maintenance task thereon.

2. The apparatus of claim 1, wherein the plurality of positioning elements comprises a plurality of rollers for moving the mounting element along the length of the tower.

3. The apparatus of claim 2, further comprising:
a plurality of spring loaded brackets, each spring-loaded bracket configured to bias a respective roller toward a surface of the tower.

4. The apparatus of claim 1, further comprising:
a driving mechanism configured to selectively move the mounting element along the length of the tower; and
a controller operatively coupled to the driving mechanism and configured to actuate the driving mechanism.

5. The apparatus of claim 1, wherein the robotic arm is a telescopic structure.

6. The apparatus of claim 5, further comprising:
a motor operatively coupled to the robotic arm and configured to selectively move adjacent portions of the robotic arm telescopically and relative to one another.

7. The apparatus of claim 1, wherein the robotic arm includes first and second opposed ends, the first end being rigidly coupled to the mounting element and the second end being pivotally coupled to the first blade-engaging device.

8. The apparatus of claim 1, wherein the robotic arm includes a pair of pivotally connected portions.

9. The apparatus of claim 1, wherein the first blade-engaging device is configured to engage a first face of the blade, the apparatus further comprising:
a second blade-engaging device configured to engage a second face of the blade opposite the first face thereof.

10. The apparatus of claim 1, wherein the blade-engaging device is one of a cleaning device and a blade surface inspecting device.

11. The apparatus of claim 1, wherein the blade-engaging device is configured to clean a surface of one of the blades while simultaneously inspecting the surface of the one of the blades for defects.

12. The apparatus of claim 1, wherein the mounting element includes a plurality of telescopically mounted segments, the telescopically mounted segments being selectively adjustable to thereby conform to a dimension of the tower.

13. A wind turbine comprising:
a tower;
a hub supported by the tower;
a plurality of blades extending outwardly from the hub;
a mounting element comprising an annular member configured to be coaxial with the tower, to at least partially encircle the tower and be secured thereto, the mounting element further comprising a plurality of positioning elements configured to selectively move the mounting element along a length of the tower;
a robotic arm coupled to the mounting element; and
a blade-engaging device coupled to the robotic arm and configured to engage one of the blades.

14. The wind turbine of claim 13, wherein the blade-engaging device is one of a cleaning device and a blade surface inspecting device.

15. The wind turbine of claim 13, wherein the blade-engaging device is configured to clean a surface of one of the blades while simultaneously inspecting the surface of the one of the blades for defects.

16. The wind turbine of claim 13, wherein the plurality of positioning elements comprises a plurality of rollers for moving the mounting element along the length of the tower.

17. A method of performing maintenance on a wind turbine having a tower, a hub supported by the tower, and a plurality of blades extending outwardly from the hub, the method comprising:
supporting a robotic arm with a mounting element configured to be secured to the tower, the mounting element comprising an annular member configured to be coaxial with the tower and to at least partially encircle the tower, the mounting element further comprising a plurality of positioning elements configured to selectively move the mounting element along a length of the tower, wherein a first blade-engaging device is coupled to the robotic arm;
controlling movement of the robotic arm to selectively engage one of the blades with the first blade-engaging device; and
performing at least one of a cleaning operation and a defect-inspection operation on the one of the blades with the first blade-engaging device.

18. The method of claim 17, further comprising:
simultaneously cleaning and inspecting a surface of the one of the blades with the first blade-engaging device.

19. The method of claim 17, further comprising:
pivotally moving the robotic arm relative to at least one of the mounting element and the first blade-engaging device.

20. The method of claim 17, further comprising:
decoupling the first blade-engaging device from the robotic arm; and
coupling a second blade-engaging device to the robotic arm, the second blade-engaging device having a different configuration from that of the first blade-engaging device.

21. A maintenance apparatus for use with a wind turbine, the wind turbine having a tower, a hub supported by the tower, and a plurality of blades extending outwardly from the hub, the maintenance apparatus comprising:
a mounting element configured to be secured to the tower and to be selectively movable along the length thereof, wherein the mounting element includes a plurality of telescopically mounted segments, the telescopically mounted segments being selectively adjustable to thereby conform to a dimension of the tower;
a robotic arm coupled to the mounting element; and a first blade-engaging device coupled to the robotic arm and configured to engage one of the blades, thereby performing a maintenance task thereon.

* * * * *